United States Patent
Gu et al.

(10) Patent No.: US 10,614,848 B2
(45) Date of Patent: Apr. 7, 2020

(54) MEDIA, SYSTEMS AND METHODS FOR OPTICAL DATA STORAGE

(71) Applicant: Shanghai Naguang Information Technology Corp., Shanghai (CN)

(72) Inventors: Min Gu, Doncaster (AU); Yaoyu Cao, Guangzhou (CN); Zongsong Gan, Hawthorn (AU); Xiangping Li, Guangzhou (CN); Benjamin Mashford, Essendon (AU); Haoran Ren, Bundoora (AU); Qiming Zhang, Hawthorn (AU)

(73) Assignee: Shanghai Naguang Information Technology Corp., Shanghai (CN)

( * ) Notice: Subject to any disclaimer, the term of this patent is extended or adjusted under 35 U.S.C. 154(b) by 0 days.

(21) Appl. No.: 15/765,267

(22) PCT Filed: Sep. 29, 2016

(86) PCT No.: PCT/CN2016/100832
§ 371 (c)(1),
(2) Date: Apr. 1, 2018

(87) PCT Pub. No.: WO2017/059782
PCT Pub. Date: Apr. 13, 2017

(65) Prior Publication Data
US 2018/0286455 A1   Oct. 4, 2018

(30) Foreign Application Priority Data

Oct. 5, 2015   (AU) .............................. 2015904039

(51) Int. Cl.
*G11B 7/24*   (2013.01)
*G11B 7/245*   (2006.01)
(Continued)

(52) U.S. Cl.
CPC ............ *G11B 7/245* (2013.01); *G11B 7/0037* (2013.01); *G11B 7/241* (2013.01); *G11B 7/242* (2013.01); *G11B 7/243* (2013.01); *G11B 7/254* (2013.01)

(58) Field of Classification Search
CPC ........... G11B 7/24; G11B 7/243; G11B 7/245; G11B 7/0037
See application file for complete search history.

(56) References Cited

U.S. PATENT DOCUMENTS 8,617,435 B2   12/2013   Malfant
2004/0027982 A1   2/2004   Hirotsune et al.
(Continued)

FOREIGN PATENT DOCUMENTS

CN   101903949 A   12/2010
CN   102473800 A   5/2012
(Continued)

OTHER PUBLICATIONS

WO2017/059782, Search Report, published Dec. 28, 2016.
(Continued)

*Primary Examiner* — Elizabeth E Mulvaney
(74) *Attorney, Agent, or Firm* — Zhu Lupkowski LLP

(57) ABSTRACT

Provided are media, systems and methods for optical data storage. A nanocomposite material for use as an optical data recording medium comprises nanoparticles embedded in a host matrix, wherein the host matrix comprises a material having a high structural stability, and the nanoparticles comprise optical functional components having a first physical or chemical state and a property of permanent transition to a second physical or chemical state upon exposure to corresponding optical radiation, whereby information may be recorded in the first and second physical or chemical states of the optical functional components over an extended time period.

16 Claims, 4 Drawing Sheets

(51) Int. Cl.
*G11B 7/243* (2013.01)
*G11B 7/242* (2006.01)
*G11B 7/241* (2006.01)
*G11B 7/0037* (2006.01)
*G11B 7/254* (2013.01)

(56) References Cited

U.S. PATENT DOCUMENTS

| | | | |
|---|---|---|---|
| 2005/0059760 | A1 | 3/2005 | Dellwo et al. |
| 2005/0169159 | A1 | 8/2005 | Tamura et al. |
| 2010/0103795 | A1 | 4/2010 | Buntel et al. |

FOREIGN PATENT DOCUMENTS

| | | |
|---|---|---|
| CN | 104157298 A | 11/2014 |
| JP | 2000081682 A | 3/2000 |
| WO | WO2006040772 A1 | 4/2006 |
| WO | 2015077815 | 6/2015 |

OTHER PUBLICATIONS

Communication pursuant to Rule 164(1) EPC, EPO, dated May 13, 2019.
First Examination Report, Chinese Application No. 201680058808.2, dated Mar. 28, 2019.
Yordanov G G et al: "Optical memory based on photo-activated fluorescence of core/shell CdSe/CdS quantum dots embedded in poly(butyl methacrylate)", Materials Chemistry and Physics, Elsevier SA, Switzerland, Taiwan, Republic of China, vol. 113, No. 2-3, Feb. 15, 2009 (Feb. 15, 2009), pp. 507-510, XP025865540, ISSN: 0254-0584, DOI: 10.1016/J.MATCHEMPHYS.2008.09.040 [retrieved on Nov. 1, 2008].
Siwick Bradley J et al: "Polymeric nanostructured material for highdensity three-dimensional optical memory storage", Journal of Applied Physics, American Institute of Physics, US, vol. 90, No. 10, Nov. 15, 2001 (Nov. 15, 2001), pp. 5328-5334, XP012053587, ISSN: 0021-8979, DOI: 10.1063/1.1406547.
J. Burunkova et al: "Enhancement of laser recording in gold/amorphous chalcogenide and gold/acrylate nanocomposite layers", Journal of Non-Crystalline Solids., vol. 402, Oct. 1, 2014 (Oct. 1, 2014), pp. 200-203, XP055578873, NL ISSN: 0022-3093, DOI: 10.1016/j.jnoncrysol.2014.03.019.
Md Azim Ullah et al: "Low energy-density recording with a highrepetition- rate laser beam in gold-nanorod-embedded discs References and links", Nat. Biotechnol. J. Am. Chem. Soc. Adv. Funct. Mater. Nature Opt. Lett. Methods Mol. Biol. Langmuir J. Phys. Chem. A J. Chem. Phys. Phys. Review B -Condens Matter and Mater Phys. J. Phys. Chem. B Chem. Chem. Phys. Opt. Express J. Phys. Chem. B Opt. E, Jan. 1, 2005 (Jan. 1, 2005), pp. 741-745, XP055578869.
EPO, Extended European search report, European Application No. 16853087.1, dated Sep. 25, 2019.

MEDIA, SYSTEMS AND METHODS FOR OPTICAL DATA STORAGE

The present application claims the priority to Australian Patent Application No. 2015904039, entitled as "Media, Systems and Methods for Optical Data Storage", filed on Oct. 5, 2015 with Australia Patent Office, which is incorporated herein by reference in its entirety.

FIELD OF THE INVENTION

The present invention relates generally to data storage media, systems and methods based on the use of optical fields (e.g. laser light) to record and retrieve information. The invention relates more particularly to storage systems suitable for recording and retaining information over long periods of time, such as a century or more.

BACKGROUND OF THE INVENTION

Optical storage media are media in which data is stored in an optically readable manner, so that they can be read, for example, by means of a laser and a photodetector being integrated in a pickup. Current generation commercial optical storage media include single- and dual-layer DVD and Blu-ray discs, in which recording and playback are based on controlling or detecting returned light from reflective layers within the medium (i.e. an optical disc). Of these, the highest data storage capacity, and greatest longevity, is achieved by Blu-ray discs, which can contain up to about 50 gigabytes of information, while some manufacturers produce 'archival quality' media with claimed lifespans of 50-100 years.

Long-term data recording and preservation, or 'long data', is a growing concern in a number of fields. For example, some datasets have a prominent temporal context over long period of time in order to capture and study changes in the world. In astrophysics, biology, geography and social science, datasets accumulated over decades, or even more than a century, have been used to study and analyse phenomena such as climate changes, mutation and global warming. Archiving and preserving information for the future generations is an equally important social obligation. To provide such long data storage, new data storage systems providing high longevity of both recorded and unrecorded regions of the storage media, and high capacity, will be required.

The timescales of long data require storage media with a lifetime of many human generations, e.g. of 100 years and beyond. Furthermore, consideration of physical storage requirements, as well as the size of some long-term datasets of interest, suggests the need for capacities of multiple terabytes per disk. For example, in biology a huge amount of information is being produced, such as the digital data representing a full-sequenced human genome which amounts to about 3.2 gigabytes. Accordingly, to study mutations in the genome of just one family over multiple generations, the accumulated digital data may easily amount to multiple terabytes over a century or more.

Accordingly, there is a demand for new high-capacity mass storage systems and media that are reliable, stable over long time periods, and cost-effective. Furthermore, when used for the accumulation of datasets in long-term data-gathering applications, media should be robust to ongoing use for recording, in contrast to archival media which generally are used only once for recording before being stored under controlled conditions, and only rarely retrieved for read-only use.

Embodiments of the present invention are therefore directed to meeting one or more of the requirements for high longevity, high data storage density and robustness required of optical media in long data storage applications.

SUMMARY OF THE INVENTION

In one aspect the invention provides a nanocomposite material for use as an optical data recording medium, comprising nanoparticles embedded in a host matrix wherein:

the host matrix comprises a material having a high structural stability; and the nanoparticles comprise optical functional components having a first physical or chemical state and a property of permanent transition to a second physical or chemical state upon exposure to corresponding optical radiation, whereby information may be recorded in the first and second physical or chemical states of the optical functional components over an extended time period.

Advantageously, the high structural stability of the host matrix material enables reliable long-term stability of unrecorded regions of the medium and retention of information recorded in the states of the optical functional components, while the use of nanoparticles enables high-density storage of information within the medium.

By 'high structural stability' is meant physical and/or thermal stability high relative to conventional materials used in optical media, such as polymer composites (e.g. polycarbonate) employed in compact discs, DVD discs, Blu-ray discs and the like, which have a Young's modulus on the order of 50 Mpa. Materials suitable for use as a host matrix according to embodiments of the invention may have Young's modulus in excess of 1 GPa, such as Young's modulus exceeding 10 GPa, or desirably Young's modulus exceeding 20 GPa.

Suitable materials for use as a host matrix may comprise hybrid composites including organic and inorganic components. For example, the host matrix material may comprise a polymer, such as poly-methyl-methacrylate (PMMA) or polycarbonate (PC) and an inorganic material, such as one or more oxides of metals or silicon. The proportion of inorganic components may exceed 50%, such as in excess of 70%, 80% or 90% of the host matrix material. In embodiments of the invention, a host matrix comprising 50% inorganic components may have Young's modulus exceeding 1 GPa. In other embodiments, a host matrix comprising 90% inorganic components may have Young's modulus exceeding 20 GPa, such as 25-30 Gpa.

In some embodiments the optical functional components comprise optical luminescence nanoparticles. In some embodiments the optical functional components comprise quantum dots doped with transition metal ions. The quantum dots may comprise a core/shell structure. In some embodiments, core/shell quantum dots comprise CdS/ZnS doped with manganese ions. The surface of the nanoparticles may be passivated, for example by sulphur atoms. The inhibited luminescence of the nanoparticles due to the sulphur atoms comprises the first chemical/physical state. A permanent transition to the second chemical/physical state may be effected by exposure to an optical recording beam.

In still further embodiments the optical functional components comprise metal nanoparticles, such as gold nanoparticles. In a first physical state the metal nanoparticles may comprise metal nanorods. A permanent transition to a second physical state may comprise exposure to an optical recording beam whereby the metal nanorods undergo reconfiguration into a second physical form, such as nanospheres.

By 'permanent transition' is meant that the first and second physical or chemical states of the optical functional components is irreversible and robust over the extended time period of storage.

By 'extended time period' is meant in excess of 50 years, more preferably in excess of 100 years, even more preferably in excess of 125 years. In some embodiments, accelerated aging experiments have indicated that stable information storage may be achieved in excess of 500 years at room temperature.

A recording medium comprising the nanocomposite material may be formed on a substrate through chemical solution spin coating/dry, chemical vapour deposition or physical vapour deposition.

In another aspect, the invention provides a recording medium comprising a plurality of layers wherein at least one layer comprises an outer protective layer, and at least one other layer comprises a nanocomposite material having nanoparticles embedded in a host matrix wherein:

the host matrix comprises a material having a high structural stability; and the nanoparticles comprise optical functional components having a first physical or chemical state and a property of permanent transition to a second physical or chemical state upon exposure to corresponding optical radiation, whereby information may be recorded in the first and second physical or chemical states of the optical functional components over an extended time period.

In some embodiments, the recording medium comprises a disc.

Further, the recording medium may comprise at least two protective layers, disposed on opposing faces of the nanocomposite material.

In some embodiments, the thickness of the nanocomposite material layer is sufficient to allow multiple internal layers of information storage.

In some embodiments, the recording medium comprises a tracking layer having radially disposed detectable tracking elements. Suitable tracking elements include one or more of: magnetic tracking elements; optical tracking elements; metallic tracking elements; and physical tracking elements (such as pits or grooves).

Further features, benefits and applications of the invention will be apparent from the following description of exemplary embodiments, which are provided to give the skilled person a fuller understanding of the nature and operation of embodiments of the invention, but which should not be considered to limit the scope of the invention as described in any of the foregoing statements, or defined in the claims appended hereto.

BRIEF DESCRIPTION OF THE DRAWINGS

Embodiments of the invention will now be described with reference to the accompanying drawings, in which like reference numerals indicate like features, and wherein.

DETAILED DESCRIPTION OF EMBODIMENTS

Figure 1:
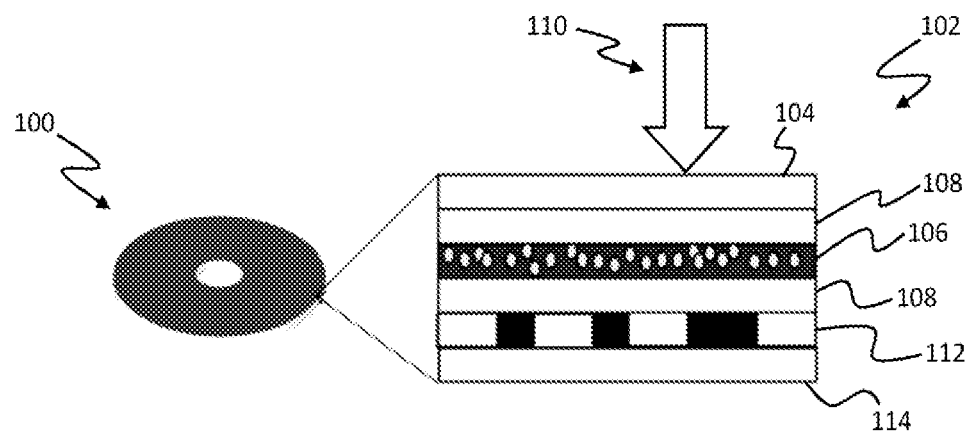
FIG. 1 illustrates schematically an exemplary disc-shaped recording medium embodying the invention.

As shown in FIG. 1 a disc-shaped recording medium 100 embodying the invention comprises a number of layers, as shown in cross-section 102. The disc 100 has a central hole, in a conventional manner, for receiving a spindle for spinning the disc. An upper protective layer 104 comprises an anti-wear substrate with refractive index matched to one or more recording layers 106.

The recording layers 106 comprise nanocomposite material having nanoparticles embedded in a host matrix. The host matrix comprises a material having a high structural stability, and the nanoparticles comprise optical functional components having a first physical or chemical state. The nanoparticles also have a property of permanent transition to a second physical or chemical state upon exposure to corresponding optical radiation.

In the embodiment shown in FIG. 1, the disc 100 also comprises spacing layers 108.

In the configuration shown, an optical field, such as a laser beam 110, irradiates the disc 100 from above. The upper protective layer 104 and spacing layer 108 are transparent to this beam. In operation, the beam is focused on a region within the recording layer 106. By appropriate control of properties of the beam 110, such as its profile, spectral composition and/or intensity, it may be used as a recording beam by inducing the permanent transition of nanoparticles within the recording layer 106 to the second physical or chemical state. These transitions may be spatially modulated within the recording layer 106 to encode stored information. The stored information can subsequently be read by detecting regions comprising nanoparticles in the alternate states, again by appropriate control of the parameters of the beam 110.

The recording layers 106 may also include markings (not shown in FIG. 1) disposed at radial intervals within the disc 100. The markings can have optically detectable properties to enable reading and writing apparatus to track the position of the recording/reading beam 110 along the radial direction. Furthermore, the exemplary disc 100 comprises a layer 112 of tracking elements. Suitable tracking elements include structures that can be detected by magnetic, optical, or electrical means, such as magnetic tracking elements (e.g. concentric rings of magnetic material), optical tracking elements (e.g. concentric rings comprising materials with detectable absorption spectra or other optical properties), metallic tracking elements, and physical tracking elements (e.g. concentric pits, grooves or corrugations between layers).

As a result, information may be recorded in the first and second physical or chemical states of the optical functional components over an extended time period resulting from the high structural stability of the host matrix material.

Figure 2:
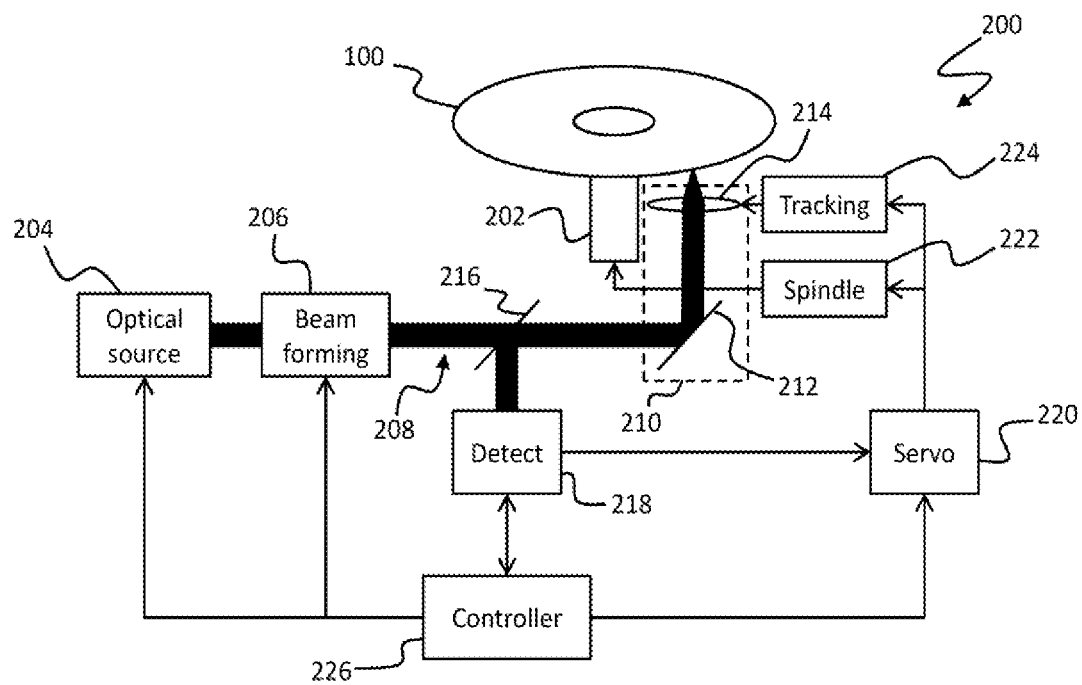
FIG. 2 is a block diagram of an optical data recording and reading apparatus embodying the invention.

FIG. 2 is a block diagram of an optical data recording and reading apparatus embodying the invention. Such an apparatus is commonly known as an optical drive, or simply a drive.

The optical drive 200 comprises a mounting 202 configured to hold the recording medium, i.e. optical disk 100. The mounting 202 comprises a spindle configured for secure mounting of the disc via the central hole, which is actuated by a motor having a controllable speed to enable an angular velocity of the disc to be controlled.

A laser source 204 includes one or more optical sources which are passed through a beam formation system 206 to create a beam 208 of optical radiation having properties suitable for reading and/or writing information from/to the disc 100. Beam properties that may be controlled at the source 204 and/or in the beam forming system 206 include spectral content (i.e. wavelength, or multiple wavelengths, of light making up the beam 208), beam profile and beam intensity. Altering one or more of these properties enables the drive 200 to switch between reading and writing functions. Altering beam properties may, in some embodiments, facilitate control of the density of data storage on the disc 100. For example, a super-resolution recording and retrieval method, such as is described in prior international patent application publication no. WO2015/077815 may be employed.

The beam is focused onto a selected region of the disc 100 via a tracking mechanism, or optical head 210, represented in the simple block diagram of FIG. 2 by a mirror 212 and lens 214. The tracking system is controllable at least to move radially relative to the disc 100, to enable selection of a particular track for recording/reading. Light reflected from the disc 100, which in reading mode may be modulated in accordance with information recorded on the disc 100, is directed via a beam splitter or partial mirror 216 to a detection system 218. The detection system 218 may comprise a photosensitive detector and demodulator to demodulate the read information, along with additional optical components, such as lenses, apertures and/or filters, to reject noise and unwanted residual laser beams.

A servo system 220 is connected to the detection system 218 and comprises a feedback loop including a spindle controller 222, which can be used to maintain the desired speed of rotation, and a tracking controller 224 which operates the optical head 210, with sufficient precision to record to, and read from, desired regions of the disc 100.

The components of the drive 200, i.e. the laser source 204, the beam formation system 206, the detection system 218 and the servo system 220, are operated under the control of an electronic controller 226, which typically comprises a microprocessor, suitable programming, and other electronic components for sending and receiving control signals between the components of the drive 200.

Further properties and parameters of recording and playback may be based on existing optical storage technologies, such as DVD and Blu-ray disc technologies. For example, a modulation technique (8-to-16 modulation) may be applied for encoding data recorded onto the disc 100. To confirm constant throughput and constant data density across the entire disc media, constant linear velocity (CLV) operation may be employed, for example at a speed of 60 m/sec, for recording and reading. Subject to minimum read and write cycle times, throughput may be improved by increasing the CLV. Throughput for bit recording is T=CLV/d, where CLV is the constant linear velocity used in the system and d is the length (i.e. on/in the physical disc 100) of a single bit.

The drive may be capable of parallel recording and reading, as described in greater detail below with reference to FIGS. 4(a) and 4(b). Recording and reading throughput may be increased accordingly. After applying parallel writing, overall data recording throughput is $T_{drive} = p \times T$, where p is the number of parallel recorded bits.

The servo system 220 and controllers 222, 224, may be implemented in a number of different ways, depending upon physical characteristics of the optical disc 100. For example, a magnetic tracking layer 112 may be provided, and magnetic elements may be detected by an additional probe (not shown) to provide an alternative or additional input to the servo system 220 to apply precision correction to the walk-off of the spinning disc during recording and reading. The main task of the servo system is to detect a position error signal and correct position errors. The probe may be operated by a micro-actuator, and located near the disc surface with magnetic track-grooves (in tracking layer 112, as shown in FIG. 1). The position of the head is determined by reading position signals pre-encoded in the track-grooves, which generates position error signals for correcting the position of the optical head 210. The servo system 220 comprises a digital controlling circuit to control the micro-actuator, transfer the position signals and coordinate the sampling rate of the servo system with the optical recording and reading system. Based on the position signals from the servo system, actuators used to drive the optical head may be capable of adjusting the relative position of laser beams with ultra-high precision, e.g. under 30 nm.

In an alternative embodiment an optical servo system may be employed, based upon an optical or electrical signal received from the detection system 218. An optical signal returned from the disc 100 may be pre-processed a quarter-photodetector, astigmatism optics and a differential circuit. A servo laser, operating, for example, at a wavelength of 658 nm, is constantly focused on a groove structure formed in the disc 100. The reflected servo laser beam then carries the walk-off information of the disc after passing through the astigmatism optics composed of a pair of circular and cylindrical lenses. The quarter-photodetector can sense the shape change of the reflected beam. The quarter-photodetector generates four signals (A, B, C and D). The differential circuit can use these four signals to judge the status of the walk-off, spindle speed, tracking error and focusing error signals. An RF signal is generated by adding the four signals (A+B+C+D). From the frequency of the RF signal, the speed of the spindle can be determined. Radial focus error can be measured by (A+C−B−D)/(A+B+C+D), which is called the focus error signal. Lateral focus error (tracking error signal) can be measured by (A+B−C−D)/(A+B+C+D). Corresponding currents will be applied to the actuators 222, 224 controlling the optical head 210 to adjust the relative position of the objective lens 214 of the head 210 with respect to the axial and lateral track position of the disc.

Figure 3:
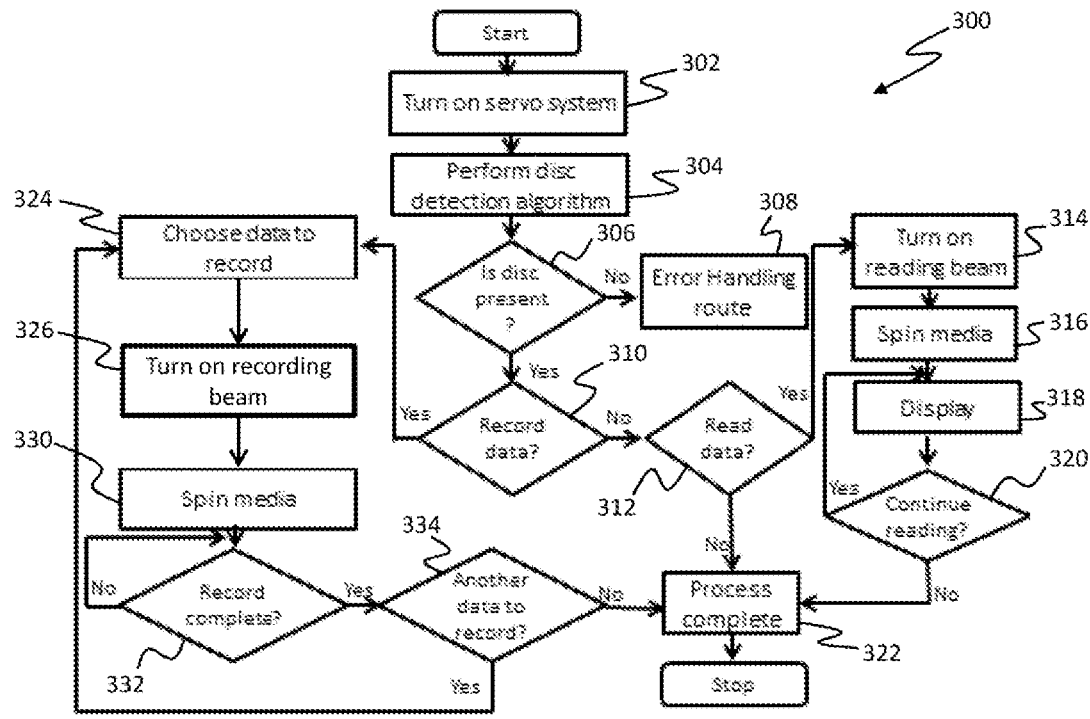
FIG. 3 shows a simplified flowchart 300 of an exemplary recording/reading control algorithm.

FIG. 3 shows a simplified flowchart 300 of an exemplary recording/reading control algorithm which may be implemented within the controller 226. The first steps, in the case of either writing or reading, are to activate 302 the servo-system and perform 304 a detection algorithm, which confirms the presence of a disc with appropriate tracking marks. If no disc is present 306, then an error is reported 308.

At the decision point 310, the algorithm proceeds along alternative paths depending upon whether a read-data operation or a record-data operation is requested. In the case of read-data 312, the controller 226 activates the reading beam at step 314. The controller 226 operates the source 204 and the beam formation system 206 to ensure that the intensity level of the reading beam 208 is sufficient to generate a detectable response from the disc 100, but below an intensity level at which a permanent transition will be induced in the nanoparticles within the recording layer 106. The controller 226 also activates the spindle motor at step 316. Typically, during a read operation some form of indication or other display will be generated 318, to provide a visual confirmation for any observer that readout is taking place. The controller continues the read operation 320 until all desired information has been retrieved from the disc 100, at which time the process is complete 322.

In greater detail, prior to reading the controller may perform address searching to find a targeted sector. For searching disc location, the controller 226 activates the servo system 220 to find the track position first. Axial scanning is performed using a low-power reading beam 208 activated by appropriate control of the source 204 and the beam formation system 206. Once the disc location is confirmed, the controller 226 synchronizes the laser gating with the disc rotation. The photosensitive detector in the detection system 218 converts the detected optical data signal into corresponding digital electrical signal. The electrical signal is demodulated by and finally transferred to a host device as retrieved data.

In the case of data recording, the controller first receives the data to be recorded at step 324. At step 326 a recording beam 208 is activated, by controlling the source 204 and the beam formation system 206 to ensure that the intensity level of the beam 208 is sufficient to induce a permanent transition in the nanoparticles within the recording layer 106. As in the case of reading, the controller activates the spindle motor at step 230. Recording then proceeds 332 until the input block of data has been fully recorded. At step 334 the controller determines whether a further block of data is to be recorded, and if so control returns to step 324. Otherwise, the recording process is complete 322.

Figure 4A:
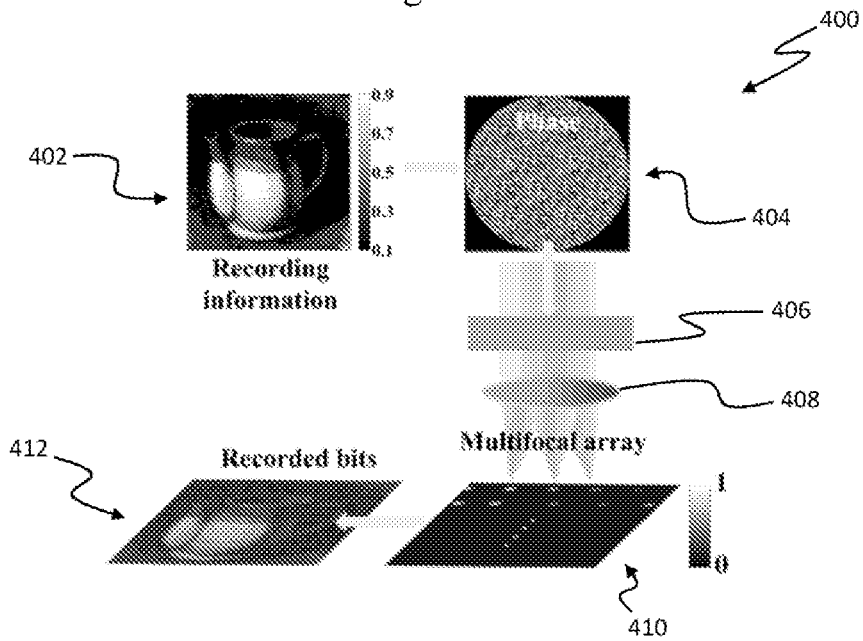
FIGS. 4(a) and 4(b) are schematic diagrams illustrating methods of parallel recording and reading, respectively, according to embodiments of the invention.
Figure 4B:
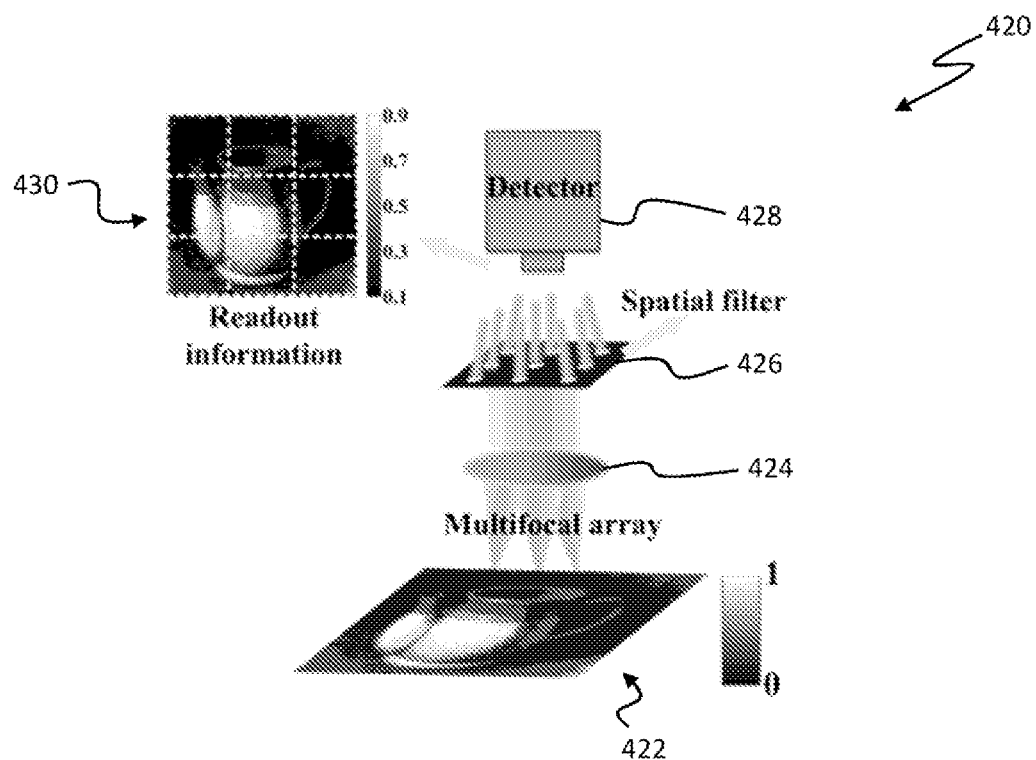

FIGS. 4(a) and 4(b) are schematic diagrams illustrating methods of parallel recording and reading, respectively, according to embodiments of the invention. In recording 400, an array of information 402 is processed to generate a corresponding phase distribution 404. The phase distribution 404 may be determined, for example, in accordance with vectorial Debye diffraction theory, and modulated onto the optical beam 208 using a spatial light modulator 406. A multifocal lens arrangement 408 then focuses an array of 'spots' onto the recording layer 106 of the disc 100, each of which has properties corresponding with the reading beam 208, modulated in accordance with the information array 402, thus producing a corresponding spatial array 412 of recorded information.

Advantageously, the parallel recording process 400 offers not only high throughput, but also the capability of individually manipulating the intensity in each focal spot. This may be used, for example, for multi-level information recording and/or for compensating an inhomogeneous optical response in the recording medium 100.

FIG. 4(b) illustrates a process 420 of reading a spatial array 422 of information recorded on a disc 100 embodying the invention. A transmitted reading beam, and light reflected or emitted from the recording layer 106, pass through a multifocal lens arrangement 424. The reading beam may be generated using a spatial light modulator to provide a plurality of focal spots, uniformly distributed on a spatial array in the focal plane, which can be scanned across the recording medium. To effectively discriminate the signal received from each focal spot, and suppress crosstalk from other spots, a spatial filter 426 comprising an array of perforated holes is provided. In some embodiments, the diameter of the holes may be, for example, around 500 μm. Generally, the number, size and location of the holes depend upon the number of foci in the reading beam array and the magnification of the optical system. A detector 428 is used to detect the returning light from the disc 100 passing through the spatial filter 426.

Accelerated aging experiments have been conducted to evaluate the long-term stability of recording media embodying the invention. For the purpose of these experiments, host matrices comprising nanocomposite materials were prepared, in which gold nanorods representing optical functional components were embedded.

More particularly, gold nanorods with an average aspect ratio of 2.7 and a diameter of 10 nm were prepared using wet chemical synthesis and nanocomposite materials were prepared by a sol-gel process. Nanorod solutions (O.D. 180) were added into the nanocomposite sol, which was then drop-cast on cover glasses. Thereafter, the cover glasses were placed in an oven at 313 K for a week.

Data storage within the experimental medium may be achieved by heating of the gold nanorods, e.g. by application of sufficiently intense laser radiation. This results in melting, and a change of state of the nanorods to nanospheres. This shape change results in a change in elastic energy in the host matrix, and the data is thereby stored in the energy minima of the system between the nanorods and nanospheres. It has been found by simulation that the gold nanorods have a free energy higher than that of spheres. Thus the lifespan of optical data storage in the nanocomposite materials mainly depends on the lifespan of the nanorods. Activation energy proportional to the melting threshold of nanorods is required to change the shape from a rod to a sphere.

At a temperature of 0 K (i.e. absolute zero) there are no thermal fluctuations and the nanorods will maintain shape indefinitely. At elevated temperatures the probability that the shape will spontaneously transition from a rod to a sphere increases according to the Arrhenius law. As a consequence of the enhanced mechanical strength of the host matrix components, additional activation energy is required for the shape transition of the nanorods to overcome the elastic energy of the host matrix, which is determined by its Young's modulus. An enhancement of activation energy reduces the probability of jumping between different shapes due to the thermal fluctuation, thus enhancing the lifespan of the shape of the nanorods.

The Young's modulus of the sample media was determined by nano-indentation (Hysitron Performech Ti750 Ubi Nanoindenter). Nine indentations arranged as a matrix of 3×3, with distance between indentations of 3 μm, were tested for every sample. The loading force increased from 0 to 800 pN in 5 seconds, was held for 10 seconds, and unloaded from 800 to 0 pN in 5 seconds. The values of Young's modulus were obtained by fitting the loading-unloading curves.

Figure 5:
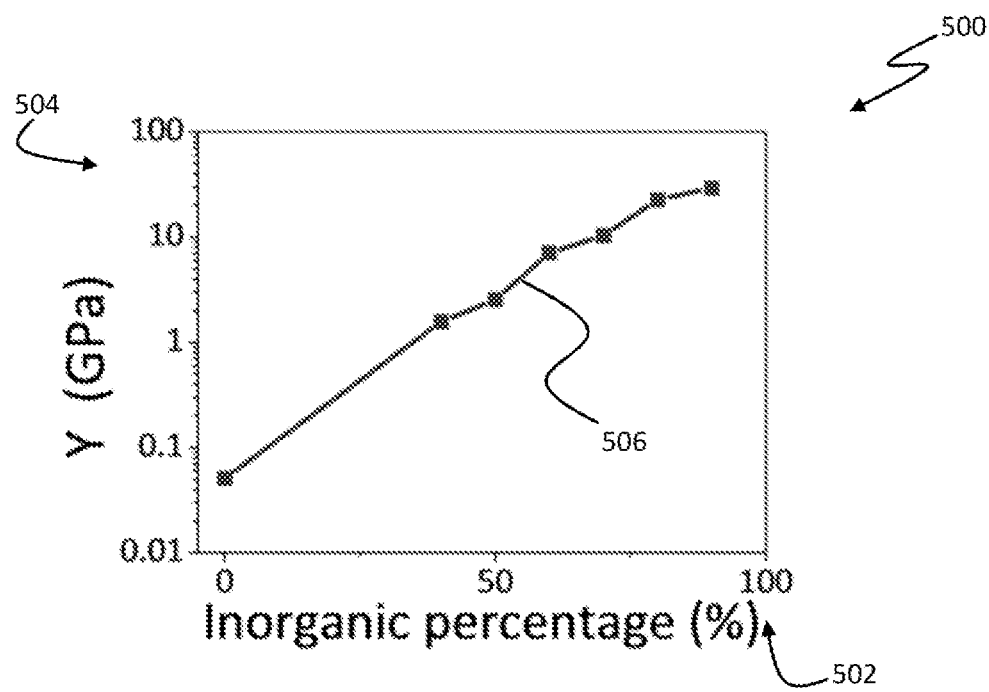
FIG. 5 shows a graph of measured Young's modulus of exemplary nanocomposite material samples.

FIG. 5 shows a graph 500 of the measured Young's modulus of the samples. The horizontal axis 502 shows the inorganic percentage of the sample, while the vertical axis 504 shows the Young's modulus in GPa. The plot 506 of results clearly shows that the Young's modulus increases by orders of magnitude as the inorganic percentage is increased between zero and 90%.

The accelerated aging experiment was conducted by holding the nanocomposite materials in an oven at 453 K. According to measurements of the lifespan of the shape of gold nanorods, it was determined that holding a sample at 453 K for three hours is equivalent to aging for 600 years at room temperature.

Figure 6A:
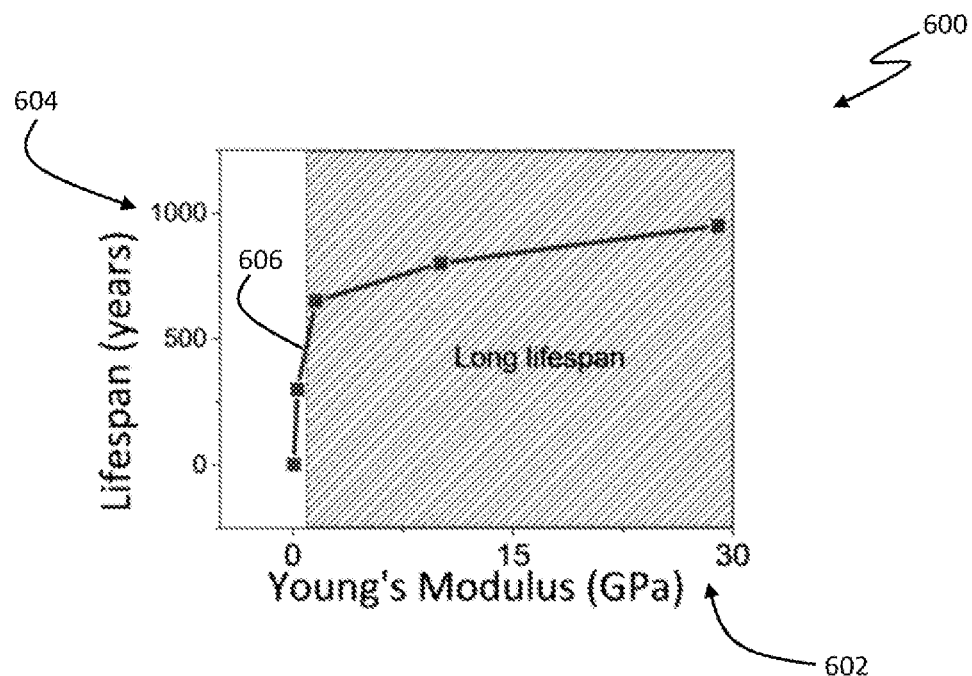
FIGS. 6(a) and 6(b) show graphs corresponding with accelerated aging tests of exemplary nanocomposite material samples.

FIG. 6(a) shows a graph 600 of estimated lifespan of data storage based upon the accelerated aging experiments. The horizontal axis 602 shows the Young's modulus in GPa, while the vertical axis is the lifespan in years. The plot 606 of results shows that there is a 'threshold' modulus, at around 1 GPa (corresponding with an inorganic percentage of around 50%) above which gains in lifetime are less pronounced. This is an advantageous characteristic, because there is a trade-off between lifespan and storage capacity as the Young's modulus of the host matrix is increased further, due to an increase in layer spacing required for stiffer materials, which results in a lower maximum recording density.

Figure 6B:
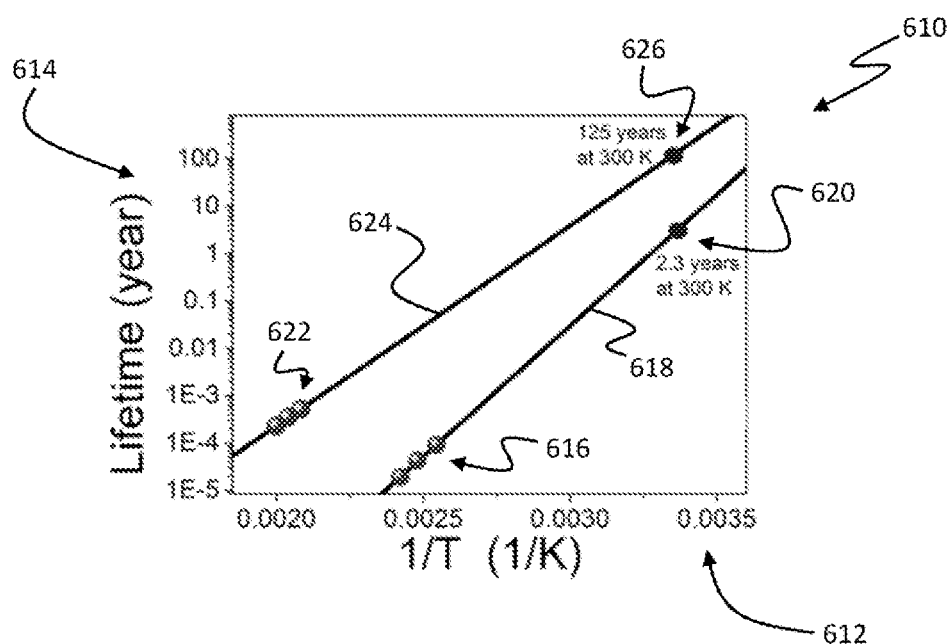

FIG. 6(b) shows a further graph 610 illustrating exemplary results of the accelerated aging experiments, in particular corresponding with the first two points on the plot 606 of FIG. 6A. The horizontal axis shows inverse temperature (1/T) in units of $K^{-1}$, while the vertical axis is lifetime in years. Experimentally measured points 616 for Young's modulus of 50 MPa are extrapolated 618 to provide an estimated lifetime 620 of 2.3 years at 300 K. By comparison, experimentally measured points 622 for Young's modulus of 50 MPa are extrapolated 624 to provide an estimated lifetime 626 of 2.3 years at 300 K.

In the above discussion, various methods, apparatus, systems and arrangements embodying the present invention have been described. It will be appreciated that these have been provided in order to facilitate a full understanding of the invention, and its practical implementation in various embodiments. It will be understood that these are not intended to indicate any specific limitations to the scope of the invention, and have been provided by way of example only. The scope of the invention is to be determined by reference to the claims appended hereto.

The claims defining the invention are as follows:

1. A nanocomposite material for use as an optical data recording medium, comprising nanoparticles embedded in a host matrix wherein: the host matrix comprises a material having a high structural stability: and the nanoparticles comprise optical functional components having a first physical or chemical state and a property of permanent transition to a second physical or chemical state upon exposure to corresponding optical radiation, whereby information may be recorded in the first and second physical or chemical states of the optical functional components over an extended time period, wherein the optical functional components comprise quantum dots doped with transition metal ions.

2. The nanocomposite material of claim 1 wherein the quantum dots comprise a core/shell structure.

3. The nanocomposite material of claim 2 wherein the core/shell quantum dots comprise CdS/ZnS doped with manganese ions.

4. A nanocomposite material for use as an optical data recording medium, comprising nanoparticles embedded in a host matrix wherein: the host matrix comprises a material having a high structural stability; and the nanoparticles comprise optical functional components having a first physical or chemical state and a property of permanent transition to a second physical or chemical state upon exposure to corresponding optical radiation, whereby information may be recorded in the first and second physical or chemical states of the optical functional components over an extended time period, wherein a surface of the nanoparticles is passivated.

5. The nanocomposite material of claim 4 wherein the surface of the nanoparticles is passivated by sulphur atoms, whereby an inhibited luminescence of the nanoparticles due to the sulphur atoms comprises the first chemical/physical state and wherein the permanent transition to the second chemical/physical state is effected by exposure to an optical recording beam.

6. A nanocomposite material for use as an optical data recording medium, comprising nanoparticles embedded in a host matrix wherein: the host matrix comprises a material having a high structural stability; and the nanoparticles comprise optical functional components having a first physical or chemical state and a property of permanent transition to a second physical or chemical state upon exposure to corresponding optical radiation: whereby information may be recorded in the first and second physical or chemical states of the optical functional components over an extended time period: wherein the optical functional components comprise metal nanoparticles, wherein in the first chemical/physical state the metal nanoparticles comprise metal nanorods and in the second chemical/physical state the metal nanoparticles comprise nanospheres, and wherein the permanent transition to a second physical state is effected by exposure to an optical recording beam.

7. A recording medium comprising the nanocomposite material of claim 6 which is disposed on a substrate.

8. The nanocomposite material of claim 6 wherein the host matrix comprises a material having Young's modulus in excess of 1 GPa.

9. The nanocomposite material of claim 6 wherein the host matrix comprises a hybrid composite including organic and inorganic components, and wherein the host matrix comprises an organic polymer and an inorganic material.

10. The nanocomposite material of claim 9 wherein the organic polymer is selected from poly-methyl-methacrylate (PMMA) or polycarbonate (PC), and the inorganic material is selected from one or more oxides of metals or silicon.

11. The nanocomposite material of claim 4 wherein the host matrix comprises a material having Young's modulus in excess of 1 GPa.

12. The nanocomposite material of claim 4 wherein the host matrix comprises a hybrid composite including organic and inorganic components, and wherein the host matrix comprises an organic polymer and an inorganic material.

13. The nanocomposite material of claim 12 wherein the organic polymer is selected from poly-methyl-methacrylate (PMMA) or polycarbonate (PC), and the inorganic material is selected from one or more oxides of metals or silicon.

14. The nanocomposite material of claim 1 wherein the host matrix comprises a material having Young's modulus in excess of 1 GPa.

15. The nanocomposite material of claim 1 wherein the host matrix comprises a hybrid composite including organic and inorganic components, and wherein the host matrix comprises an organic polymer and an inorganic material.

16. The nanocomposite material of claim 15 wherein the organic polymer is selected from poly-methyl-methacrylate (PMMA) or polycarbonate (PC), and the inorganic material is selected from one or more oxides of metals or silicon.

* * * * *